(12) United States Patent
Shakimov et al.

(10) Patent No.: US 9,923,760 B2
(45) Date of Patent: Mar. 20, 2018

(54) REDUCTION OF CHURN IN A NETWORK CONTROL SYSTEM

(71) Applicant: Nicira, Inc., Palo Alto, CA (US)

(72) Inventors: Amre Shakimov, Cupertino, CA (US); Srinivas Neginhal, Santa Clara, CA (US); Anupam Chanda, San Jose, CA (US); Su Wang, Sunnyvale, CA (US); Pankaj Thakkar, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 28 days.

(21) Appl. No.: 14/814,228

(22) Filed: Jul. 30, 2015

(65) Prior Publication Data

US 2016/0294680 A1    Oct. 6, 2016

Related U.S. Application Data

(60) Provisional application No. 62/143,706, filed on Apr. 6, 2015.

(51) Int. Cl.
    *H04J 1/16*     (2006.01)
    *H04L 12/24*     (2006.01)
    (Continued)

(52) U.S. Cl.
    CPC .......... *H04L 41/0668* (2013.01); *H04L 45/02* (2013.01); *H04L 45/28* (2013.01);
    (Continued)

(58) Field of Classification Search
    CPC ..... H04L 41/0668; H04L 45/02; H04L 45/28; H04L 45/38; H04L 45/586; H04L 69/40
    See application file for complete search history.

(56) References Cited

U.S. PATENT DOCUMENTS

| | | |
|---|---|---|
| 5,426,774 A | 6/1995 | Banerjee et al. |
| 5,504,921 A | 4/1996 | Dev et al. |
| | (Continued) | |

FOREIGN PATENT DOCUMENTS

| | | |
|---|---|---|
| EP | 0737921 A2 | 10/1996 |
| EP | 1443423 A1 | 8/2004 |
| | (Continued) | |

OTHER PUBLICATIONS

International Search Report and Written Opinion for PCT/US2017/013820, dated May 4, 2017, Nicira, Inc., International Search Report and Written Opinion of commonly owned, counterpart International Patent Application PCT/US2017/013820.

(Continued)

*Primary Examiner* — Kan Yuen

(74) *Attorney, Agent, or Firm* — Adeli LLP

(57) ABSTRACT

Some embodiments provide a network control system with techniques for handling failover of network controllers with minimal churn in the network state distributed to the forwarding elements of the network. Specifically, in some embodiments, the local controller designates a waiting period before computing output network state data entries based on the new version of the input network state data entries. Alternatively, or conjunctively, the local controller of some embodiments calculates the changes between the new version of input state data entries and its stored existing version of the input state data entries, and only generates new output network state data entries based on the calculated changes, in order to minimize unnecessary recalculations of the output network state data entries. The new output network state data entries may then be used by the local controller to provision its managed forwarding element.

25 Claims, 8 Drawing Sheets

(51) Int. Cl.
*H04L 29/14* (2006.01)
*H04L 12/751* (2013.01)
*H04L 12/703* (2013.01)
*H04L 12/721* (2013.01)
*H04L 12/713* (2013.01)

(52) U.S. Cl.
CPC ............ *H04L 45/38* (2013.01); *H04L 45/586* (2013.01); *H04L 69/40* (2013.01)

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |
| 6,055,243 A | 4/2000 | Vincent et al. |
| 6,104,699 A | 8/2000 | Holender et al. |
| 6,219,699 B1 | 4/2001 | McCloghrie et al. |
| 6,366,582 B1 | 4/2002 | Nishikado et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,042,912 B2 | 5/2006 | Ashwood Smith et al. |
| 7,046,630 B2 | 5/2006 | Abe et al. |
| 7,096,228 B2 | 8/2006 | Theimer et al. |
| 7,120,728 B2 | 10/2006 | Krakirian et al. |
| 7,126,923 B1 | 10/2006 | Yang et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,359,971 B2 | 4/2008 | Jorgensen |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,903,666 B1 | 3/2011 | Kumar et al. |
| 7,929,424 B2 | 4/2011 | Kochhar et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,060,875 B1 | 11/2011 | Lambeth |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,239,572 B1 | 8/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,321,561 B2 | 11/2012 | Fujita et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,578,003 B2 | 11/2013 | Brandwine et al. |
| 8,612,627 B1 | 12/2013 | Brandwine |
| 8,621,058 B2 | 12/2013 | Eswaran et al. |
| 8,644,188 B1 | 2/2014 | Brandwine et al. |
| 8,705,513 B2 | 4/2014 | Van Der Merwe et al. |
| 8,762,501 B2 | 6/2014 | Kempf et al. |
| 8,958,298 B2 | 2/2015 | Zhang et al. |
| 8,959,215 B2 | 2/2015 | Koponen et al. |
| 9,007,903 B2 | 4/2015 | Koponen et al. |
| 9,083,609 B2 | 7/2015 | Casado et al. |
| 9,124,538 B2 | 9/2015 | Koponen et al. |
| 9,137,107 B2 | 9/2015 | Koponen et al. |
| 9,154,433 B2 | 10/2015 | Koponen et al. |
| 9,172,603 B2 | 10/2015 | Padmanabhan et al. |
| 9,178,833 B2 | 11/2015 | Koponen et al. |
| 9,203,701 B2 | 12/2015 | Koponen et al. |
| 9,306,843 B2 | 4/2016 | Koponen et al. |
| 9,391,880 B2 | 7/2016 | Koide |
| 2001/0043614 A1 | 11/2001 | Viswanadham et al. |
| 2001/0044825 A1 | 11/2001 | Barritz |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2003/0204768 A1 | 10/2003 | Fee |
| 2003/0233385 A1 | 12/2003 | Srinivasa et al. |
| 2004/0044773 A1 | 3/2004 | Bayus et al. |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0101274 A1 | 5/2004 | Foisy et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0147095 A1 | 7/2005 | Guerrero et al. |
| 2005/0220096 A1 | 10/2005 | Friskney et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0028999 A1 | 2/2006 | Iakobashvili et al. |
| 2006/0092940 A1 | 5/2006 | Ansari et al. |
| 2006/0092976 A1 | 5/2006 | Lakshman et al. |

(56) References Cited

U.S. PATENT DOCUMENTS

| | | |
|---|---|---|
| 2006/0174087 A1 | 8/2006 | Hashimoto et al. |
| 2006/0182033 A1 | 8/2006 | Chen et al. |
| 2006/0182037 A1 | 8/2006 | Chen et al. |
| 2006/0184937 A1 | 8/2006 | Abels et al. |
| 2006/0193266 A1 | 8/2006 | Siddha et al. |
| 2006/0221961 A1 | 10/2006 | Basso et al. |
| 2007/0005627 A1 | 1/2007 | Dodge |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0239987 A1 | 10/2007 | Hoole et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0133687 A1* | 6/2008 | Fok .............. G06F 9/5027 709/207 |
| 2008/0159301 A1 | 7/2008 | de Heer |
| 2008/0163207 A1 | 7/2008 | Reumann et al. |
| 2008/0165704 A1 | 7/2008 | Marchetti et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0031041 A1 | 1/2009 | Clemmensen |
| 2009/0043823 A1 | 2/2009 | Iftode et al. |
| 2009/0070501 A1 | 3/2009 | Kobayashi et al. |
| 2009/0083445 A1 | 3/2009 | Ganga |
| 2009/0113031 A1 | 4/2009 | Ruan et al. |
| 2009/0122710 A1 | 5/2009 | Bar-Tor et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0245793 A1 | 10/2009 | Chiang |
| 2009/0249470 A1 | 10/2009 | Litvin et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0279549 A1 | 11/2009 | Ramanathan et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046530 A1 | 2/2010 | Hautakorpi et al. |
| 2010/0046531 A1 | 2/2010 | Louati et al. |
| 2010/0058106 A1 | 3/2010 | Srinivasan et al. |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0191848 A1 | 7/2010 | Fujita et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage et al. |
| 2011/0032830 A1 | 2/2011 | Van Der Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0173490 A1 | 7/2011 | Narayanaswamy et al. |
| 2011/0261825 A1 | 10/2011 | Ichino |
| 2011/0273988 A1 | 11/2011 | Tourrilhes et al. |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0310899 A1 | 12/2011 | Alkhatib et al. |
| 2011/0317559 A1 | 12/2011 | Kern et al. |
| 2011/0317701 A1 | 12/2011 | Yamato et al. |
| 2012/0014386 A1 | 1/2012 | Xiong et al. |
| 2012/0147894 A1 | 6/2012 | Mulligan et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0044636 A1 | 2/2013 | Koponen et al. |
| 2013/0044752 A1 | 2/2013 | Koponen et al. |
| 2013/0054761 A1 | 2/2013 | Kempf et al. |
| 2013/0058346 A1 | 3/2013 | Sridharan et al. |
| 2013/0060940 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0125230 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |
| 2013/0227097 A1 | 8/2013 | Yasuda et al. |
| 2013/0332602 A1 | 12/2013 | Nakil et al. |
| 2013/0332619 A1 | 12/2013 | Xie et al. |
| 2014/0016501 A1 | 1/2014 | Kamath et al. |
| 2014/0019639 A1 | 1/2014 | Ueno |
| 2014/0040466 A1 | 2/2014 | Yang |
| 2014/0189212 A1 | 7/2014 | Slaight et al. |
| 2014/0247753 A1 | 9/2014 | Koponen et al. |
| 2014/0348161 A1 | 11/2014 | Koponen et al. |
| 2014/0351432 A1 | 11/2014 | Koponen et al. |
| 2015/0009804 A1* | 1/2015 | Koponen ............ H04L 41/0695 370/219 |
| 2015/0341205 A1* | 11/2015 | Invernizzi ........... H04L 67/2819 370/219 |
| 2016/0119224 A1 | 4/2016 | Ramachandran et al. |
| 2016/0197774 A1 | 7/2016 | Koponen et al. |

FOREIGN PATENT DOCUMENTS

| | | |
|---|---|---|
| EP | 2838244 A2 | 2/2015 |
| GB | 2485866 A | 5/2012 |
| WO | 2009001845 A1 | 12/2008 |
| WO | 2011080870 A1 | 7/2011 |

OTHER PUBLICATIONS

Kent, William, "A Simple Guide to Five Normal Forms in Relational Database Theory," Communications of the ACM, Feb. 1, 1983, 6 pages, vol. 26, No. 2, Association for Computing Machinery, Inc., USA.

(56) References Cited

OTHER PUBLICATIONS

Ciavaglia, Laurent, et al., "An Architectural Reference Model for Autonomic Networking, Cognitive Networking and Self-Management," Mar. 2012, 179 pages, Draft ETSI GS AFI 002 V0.0.17, European Telecommunications Standards Institute (ETSI).

Reitblatt, Mark, et al., "Consistent Updates for Software-Defined Networks: Change You Can Believe in!" Proceedings of the 10th ACM Workshop on Hot Topics in Networks, Nov. 14-15, 2011, 6 pages, ACM, Cambridge, MA.

Wang, Wei-Ming, et al., "Analysis and Implementation of an Open Programmable Router Based on Forwarding and Control Element Separation," Journal of Computer Science and Technology, Sep. 2008, 11 pages, vol. 23 Issue 5, Springer International Publishing AG.

Adya, Atul, et al., "Cooperative Task Management without Manual Stack Management," Proceedings of the 2002 USENIX Annual Technical Conference, Jun. 2002, 14 pages, Monterey, CA, USA.

Caesar, Matthew, et al., "Design and Implementation of a Routing Control Platform," NSDI '05: 2nd Symposium on Networked Systems Design & Implementation, Apr. 2005, 14 pages, USENIX Association.

Cai, Zheng, et al., "The Preliminary Design and Implementation of the Maestro Network Control Platform," Oct. 1, 2008, 17 pages, NSF.

Casado, Martin, et al. "Ethane: Taking Control of the Enterprise," SIGCOMM'07, Aug. 27-31, 2007, 12 pages, ACM, Kyoto, Japan.

Enns, R., "NETCONF Configuration Protocol," Dec. 2006, 96 pages, IETF Trust (RFC 4741).

Greenberg, Albert, et al., "A Clean Slate 4D Approach to Network Control and Management," ACM SIGCOMM Computer Communication Review, Oct. 2005, 12 pages, vol. 35, No. 5.

Greenberg, Albert, et al., "VL2: A Scalable and Flexible Data Center Network," SIGCOMM'09, Aug. 17-21, 2009, 12 pages, ACM, Barcelona, Spain.

Gude, Natasha, et al., "NOX: Towards an Operating System for Networks," ACM SIGCOMM Computer Communication Review, Jul. 2008, 6 pages, vol. 38, No. 3.

Hinrichs, Timothy L., et al., "Practical Declarative Network Management," WREN'09, Aug. 21, 2009, 10 pages, Barcelona, Spain.

Koponen, Teemu, et al., "Onix: A Distributed Control Platform for Large-scale Production Networks," In Proc. OSDI, Oct. 2010, 14 pages.

Krishnaswamy, Umesh, et al., "ONOS Open Network Operating System—An Experimental Open-Source Distributed SDN OS," Apr. 16, 2013, 24 pages.

Pankaj, Berde, et al., "ONOS Open Network Operating System—An Experimental Open-Source Distributed SDN OS," Dec. 19, 2013, 4 pages.

Schneider, Fred B., "Implementing Fault-Tolerant Services Using the State Machine Approach: A Tutorial," ACM Computing Surveys, Dec. 1990, 21 pages, vol. 22, No. 4, ACM.

Terry, Douglas B., et al., "Managing Update Conflicts in Bayou, a Weakly Connected Replicated Storage System," SIGOPS '95, Dec. 1995, 12 pages, ACM, Colorado, USA.

* cited by examiner

REDUCTION OF CHURN IN A NETWORK CONTROL SYSTEM

BACKGROUND

The data plane of a forwarding element in a network defines the way that packets will be forwarded by the forwarding element through the network. In some networks, the data plane is defined at the forwarding elements based on control plane data received from network controllers. The network controllers define a control plane for the forwarding elements based on a desired network state and distribute the control plane to the forwarding elements in order for the forwarding elements to implement the network state in their respective data planes. The forwarding elements forward data messages (e.g., Ethernet frames, Internet Protocol (IP) packets, Transmission Control Protocol (TCP) segments, User Datagram Protocol (UDP) datagrams, etc.) through the network based on their respective data planes, as defined according to the current network state.

Network controllers (like any other computing devices) may occasionally fail. At this point, a new network controller will take over the provision of control plane data to the forwarding element(s). Ideally, this failover should result in a minimum of churn (e.g., data plane recalculation) for the forwarding elements.

BRIEF SUMMARY

Some embodiments provide a network control system with techniques for handling failover of network controllers with minimal churn in the network state distributed to the forwarding elements of the network. The network control system of some embodiments includes (i) a cluster of centralized network controllers for managing the network state to be implemented on physical forwarding elements (e.g., hardware or software forwarding elements) of the network and (ii) local controllers that distribute the network state to the physical forwarding elements in a format understandable by the physical forwarding elements. In some embodiments, the centralized controllers distribute abstract network state data to the local controllers, which compute the understandable network state data and pass this understandable network state data to the physical forwarding elements. The local controllers, in some embodiments, each operate on the same physical machine as one of the physical forwarding elements.

In some embodiments, the network state maintained by the centralized network controllers defines logical networks for implementation in a distributed manner by the physical forwarding elements. Each logical network is defined by an administrator as a set of logical forwarding elements (e.g., logical switch, logical router) that logically connect a set of end machines. Each logical network or logical forwarding element is then defined as a set of data tuples (or data records) by a particular centralized controller that manages the particular logical network (or logical forwarding element).

The centralized controller distributes these abstract data tuples to the local controllers that manage the forwarding elements that will implement the logical network. In some embodiments, the end machines (e.g., virtual machines) of the logical network are distributed through the physical network on various host machines, and each forwarding element to which one of these end machines connects (e.g., a software virtual switch that operates on the same physical machine as the end machine) implements the logical network. Thus, each of the local controllers for these forwarding elements receives the abstract data tuples and computes output network state data to provide to its respective forwarding element.

In some embodiments, each local controller that manages a physical forwarding element (referred to herein as a managed forwarding element) receives input network state data entries (the abstract data tuples) and computes output network state data entries (the data tuples translated into a format understandable by the managed forwarding element). This output network state data serves as the control plane data for the managed forwarding element, defining the operation of its data plane. These output network state data entries define forwarding behaviors of the managed forwarding elements, and may also instruct the managed forwarding elements to create and tear down tunnels, configure network constructs (e.g., ports, port queues, etc.).

In some instances, the local controller loses a connection with the centralized network controller that provides the input network state data entries for a particular logical network. The local controller can lose the connection with the centralized network controller when the centralized network controller fails or restarts, when network connectivity with the centralized network controller is lost, etc. While in some cases, the primary centralized network controller is able to quickly recover and re-establish a connection with the local controller, in general after a primary centralized network controller disconnects from the local controller (e.g., due to failure of the centralized network controller, network issues, etc.), a secondary (or backup) centralized network controller takes over as the new primary controller for the particular logical network. This new primary controller provides a new version of the input network state data entries for the input state to a local controller for generating new output network state data entries.

In many cases, the new version of the input state data entries is similar, if not identical, to the previous version of the input state data entries. As such, new output network state data entries generated from the new version of the input state data entries would also be similar or identical to the existing output network state data entries. However, when a new primary centralized network controller takes over responsibility for a particular logical network, the new primary centralized network controller may initially provide the local controllers with an empty set of input network state data entries for the logical network. In such cases, tearing down the existing network state (i.e., the output network state data entries) and rebuilding it from the newly received input state data entries introduces unnecessary churn into the system, forcing (i) the local controller to recalculate largely the same output network state data entries that it already has and (ii) the managed forwarding element to reinstall the same control plane and recompute its data plane behavior. This churn may affect the availability of the network and may create delays in propagating updates of the network state to the physical network elements.

Thus, some embodiments of the invention provide different methods for reducing this churn while maintaining a consistent network state for a set of managed forwarding elements. Specifically, in some embodiments, the local controller designates a waiting period before computing output network state data entries based on the new version of the input network state data entries. Alternatively, or conjunctively, the local controller of some embodiments calculates the changes between the new version of input state data entries and its stored existing version of the input state data entries, and only generates new output network state data entries based on the calculated changes, in order to minimize unnecessary recalculations of the output network state data entries. The new output network state data entries may then be used by the local controller to provision its managed forwarding element.

Upon receiving an initial indication from the new primary centralized network controller that a full network state has been sent to a local controller, the local controller of some embodiments begins a timed waiting period (e.g., 30 seconds, 1 minute, 5 minutes, etc.) to receive additional updates from the new primary centralized network controller. Only after completion of the timed waiting period does the local controller compute the new output state to provide control plane data to its managed forwarding element.

In various embodiments, this waiting period may be a predetermined length of time, or may be determined based on a size of the network, a comparison between the new input network state data entries and the existing input network state data entries, etc. In addition, the local controller processes different portions of the new input network state data differently with regards to the timed waiting period. For example, some embodiments use a shortened waiting period (or no waiting period at all) for additions to the output network state data, but will provide a longer waiting period before deleting portions of the output network state data.

The local controller may receive additional updates to the new input network state data entries during the waiting period, allowing the controller to incorporate these updates before modifying the output network state data entries based on the new input network state data entries. Once the waiting period elapses, the local controller generates new output network state data entries based on the new input network state data entries, including any updates received during the waiting period. These output network state data entries are then provided to the managed forwarding element that the local controller manages, enabling the managed forwarding element to modify its state.

In addition to, or instead of using the waiting period, the local controller of some embodiments calculates differences between the new version of the input state and an existing version of the input state prior to generating a new output state, in order to avoid unnecessary recalculations of the state. Upon detecting that the connection with the initial primary centralized network controller has failed and that control has switched over to a secondary centralized network controller, the local controller marks all of the existing input network state data entries for deletion.

In some embodiments, the local controller marks the existing input network state data entries for deletion using shadow tables. In order to mark the input network state data entries for deletion, the local controller of some embodiments stores a set of entries that indicate the input network state data entries to be deleted in a set of shadow tables before applying the changes (i.e., deleting the network state data entries) to the active input and output states.

Once the existing input state has been marked for deletion, the local controller of some embodiments compares the new input network state data entries with the existing input network state data entries to identify (i) network state data entries of the new input network state data entries that match with existing input network state data entries, (ii) stale network state data entries of the existing input network state data entries that have no corresponding entry in the new input network state data entries, and (iii) new data entries of the new input network state data entries that have no corresponding portion in the existing input network state data entries.

The local controller of some embodiments then unmarks from deletion the existing input network state data entries that match with new input network state data entries (while also removing the corresponding entries from the new input network state data entries), so that the corresponding output network state data entries will not be deleted. The local controller of some embodiments then adds the new input network state data entries to the existing input state data and calculates new output state data based on the new input network state data entries. Finally, the local controller of some embodiments removes the stale input network state data entries and the corresponding stale output network state data entries. In this manner, generating the new output network state data entries does not require the recalculation of the output network state data entries that overlap between the new and existing network state data entries. The new output network state data entries may then be used by the local controller to provision its managed forwarding element.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
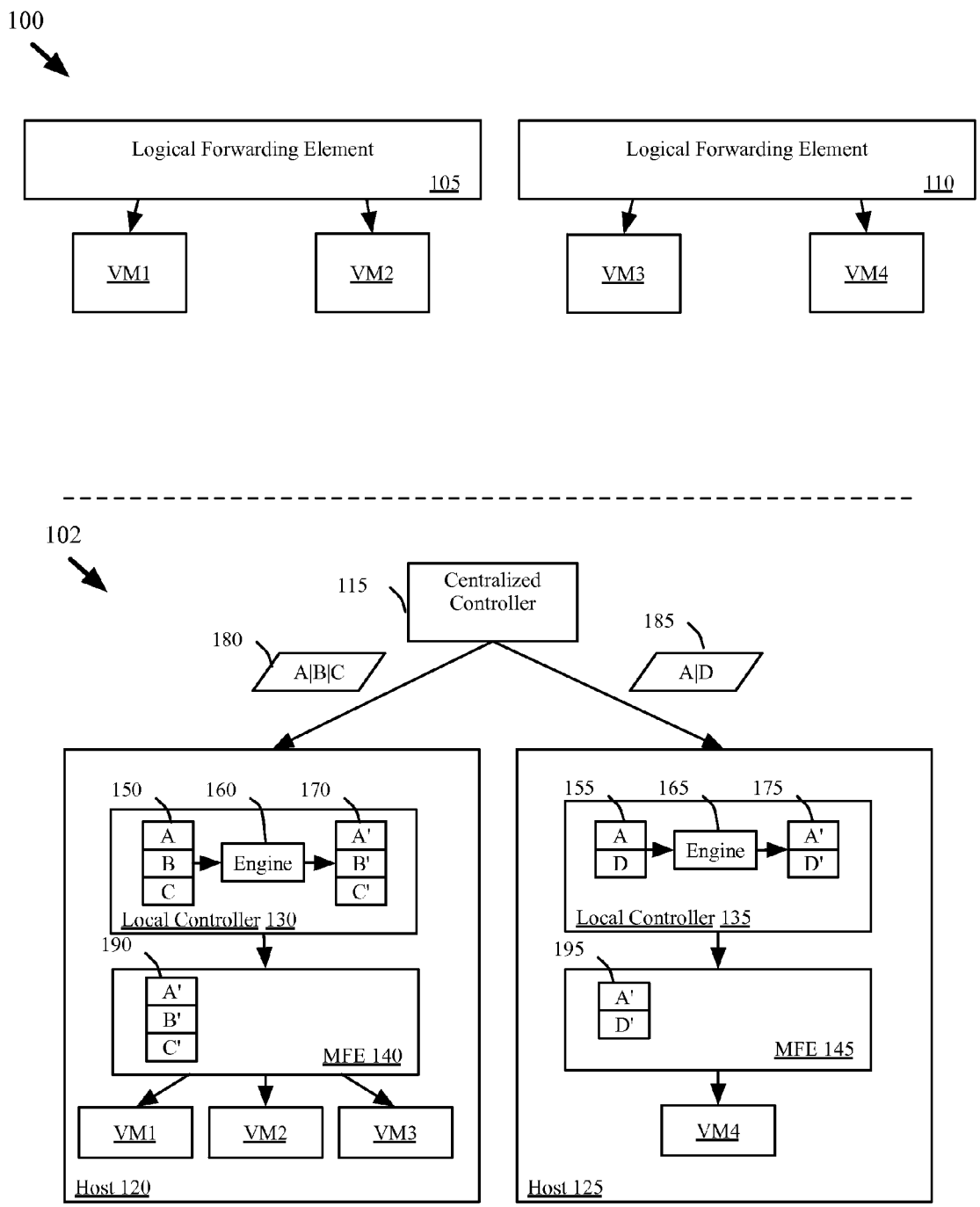
FIG. 1 illustrates an example of a logical network implemented on a physical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system with techniques for handling failover of network controllers with minimal churn in the network state distributed to the forwarding elements of the network. The network control system of some embodiments includes (i) a cluster of centralized network controllers for managing the network state to be implemented on physical forwarding elements (e.g., hardware or software forwarding elements) of the network and (ii) local controllers that distribute the network state to the physical forwarding elements in a format understandable by the physical forwarding elements. In some embodiments, the centralized controllers distribute abstract network state data to the local controllers, which compute the understandable network state data and pass this understandable network state data to the physical forwarding elements. The local controllers, in some embodiments, each operate on the same physical machine as one of the physical forwarding elements.

In some embodiments, the network state maintained by the centralized network controllers defines logical networks for implementation in a distributed manner by the physical forwarding elements. Each logical network is defined by an administrator as a set of logical forwarding elements (e.g., logical switch, logical router) that logically connect a set of end machines. Each logical network or logical forwarding element is then defined as a set of data tuples (or data records) by a particular centralized controller that manages the particular logical network (or logical forwarding element).

The centralized controller distributes these abstract data tuples to the local controllers that manage the forwarding elements that will implement the logical network. In some embodiments, the end machines (e.g., virtual machines) of the logical network are distributed through the physical network on various host machines, and each forwarding element to which one of these end machines connects (e.g., a software virtual switch that operates on the same physical machine as the end machine) implements the logical network. Thus, each of the local controllers for these forwarding elements receives the abstract data tuples and computes output network state data to provide to its respective forwarding element.

In some embodiments, each local controller that manages a physical forwarding element (referred to herein as a managed forwarding element) receives input network state data entries (the abstract data tuples) and computes output network state data entries (the data tuples translated into a format understandable by the managed forwarding element). This output network state data serves as the control plane data for the managed forwarding element, defining the operation of its data plane. These output network state data entries define forwarding behaviors of the managed forwarding elements, and may also instruct the managed forwarding elements to create and tear down tunnels, configure network constructs (e.g., ports, port queues, etc.).

In some instances, the local controller loses a connection with the centralized network controller that provides the input network state data entries for a particular logical network. The local controller can lose the connection with the centralized network controller when the centralized network controller fails or restarts, when network connectivity with the centralized network controller is lost, etc. While in some cases, the primary centralized network controller is able to quickly recover and re-establish a connection with the local controller, in general after a primary centralized network controller disconnects from the local controller (e.g., due to failure of the centralized network controller, network issues, etc.), a secondary (or backup) centralized network controller takes over as the new primary controller for the particular logical network. This new primary controller provides a new version of the input network state data entries for the input state to a local controller for generating new output network state data entries.

In many cases, the new version of the input state data entries is similar, if not identical, to the previous version of the input state data entries. As such, new output network state data entries generated from the new version of the input state data entries would also be similar or identical to the existing output network state data entries. However, when a new primary centralized network controller takes over responsibility for a particular logical network, the new primary centralized network controller may initially provide the local controllers with an empty set of input network state data entries for the logical network. In such cases, tearing down the existing network state (i.e., the output network state data entries) and rebuilding it from the newly received input state data entries introduces unnecessary churn into the system, forcing (i) the local controller to recalculate largely the same output network state data entries that it already has and (ii) the managed forwarding element to reinstall the same control plane and recompute its data plane behavior. This churn may affect the availability of the network and may create delays in propagating updates of the network state to the physical network elements.

Thus, some embodiments of the invention provide different methods for reducing this churn while maintaining a consistent network state for a set of managed forwarding elements. Specifically, in some embodiments, the local controller designates a waiting period before computing output network state data entries based on the new version of the input network state data entries. Alternatively, or conjunctively, the local controller of some embodiments calculates the changes between the new version of input state data entries and its stored existing version of the input state data entries, and only generates new output network state data entries based on the calculated changes, in order to minimize unnecessary recalculations of the output network state data entries. The new output network state data entries may then be used by the local controller to provision its managed forwarding element.

Upon receiving an initial indication from the new primary centralized network controller that a full network state has been sent to a local controller, the local controller of some embodiments begins a timed waiting period (e.g., 30 seconds, 1 minute, 5 minutes, etc.) to receive additional updates from the new primary centralized network controller. Only after completion of the timed waiting period does the local controller compute the new output state to provide control plane data to its managed forwarding element.

In various embodiments, this waiting period may be a predetermined length of time, or may be determined based on a size of the network, a comparison between the new input network state data entries and the existing input network state data entries, etc. In addition, the local controller processes different portions of the new input network state data differently with regards to the timed waiting period. For example, some embodiments use a shortened waiting period (or no waiting period at all) for additions to the output network state data, but will provide a longer waiting period before deleting portions of the output network state data.

The local controller may receive additional updates to the new input network state data entries during the waiting period, allowing the controller to incorporate these updates before modifying the output network state data entries based on the new input network state data entries. Once the waiting period elapses, the local controller generates new output network state data entries based on the new input network state data entries, including any updates received during the waiting period. These output network state data entries are then provided to the managed forwarding element that the local controller manages, enabling the managed forwarding element to modify its state.

In addition to, or instead of using the waiting period, the local controller of some embodiments calculates differences between the new version of the input state and an existing version of the input state prior to generating a new output state, in order to avoid unnecessary recalculations of the state. Upon detecting that the connection with the initial primary centralized network controller has failed and that control has switched over to a secondary centralized network controller, the local controller marks all of the existing input network state data entries for deletion.

In some embodiments, the local controller marks the existing input network state data entries for deletion using shadow tables. In order to mark the input network state data entries for deletion, the local controller of some embodiments stores a set of entries that indicate the input network state data entries to be deleted in a set of shadow tables before applying the changes (i.e., deleting the network state data entries) to the active input and output states.

Once the existing input state has been marked for deletion, the local controller of some embodiments compares the new input network state data entries with the existing input network state data entries to identify (i) network state data entries of the new input network state data entries that match with existing input network state data entries, (ii) stale network state data entries of the existing input network state data entries that have no corresponding entry in the new input network state data entries, and (iii) new data entries of the new input network state data entries that have no corresponding portion in the existing input network state data entries.

The local controller of some embodiments then unmarks from deletion the existing input network state data entries that match with new input network state data entries (while also removing the corresponding entries from the new input network state data entries), so that the corresponding output network state data entries will not be deleted. The local controller of some embodiments then adds the new input network state data entries to the existing input state data and calculates new output state data based on the new input network state data entries. Finally, the local controller of some embodiments removes the stale input network state data entries and the corresponding stale output network state data entries. In this manner, generating the new output network state data entries does not require the recalculation of the output network state data entries that overlap between the new and existing network state data entries. The new output network state data entries may then be used by the local controller to provision its managed forwarding element.

As described above, the network state maintained by the centralized network controllers of some embodiments defines logical networks for implementation in a distributed manner by the physical forwarding elements. FIG. 1 illustrates an example of a logical network implemented on a physical network. This figure conceptually illustrates a logical network 100 and a physical network 102 for implementing the logical network 100. The logical network 100 shows a first logical forwarding element 105 coupled to virtual machines (VMs) 1 and 2 and a second logical forwarding element 110 coupled to VMs 3 and 4. The first and second logical forwarding elements 105 and 110 of some embodiments belong to different tenants in a datacenter that houses the physical network 102.

The physical network 102 includes a centralized network controller 115 and hosts 120 and 0125. Host 120 includes a local controller 130, a managed forwarding element 140, and VMs 1-3. Host 125 includes a local controller 135, a managed forwarding element 145, and VM 4. The centralized network controller 115 sends data 180 and 185 to the local controllers 130 and 135 respectively.

The data 180 and 185 of some embodiments includes input network state data entries (e.g., data tuples, etc.) for the local controllers 130 and 135. In this example, data 180 includes input network state data entries A, B, and C, while data 185 includes input network state data entries A and D. As shown in this example, the local controllers 130 and 135 may receive different portions of the input network state data depending on the portions required by each associated local controller.

The local controllers 130 and 135 of some embodiments process the input network state data entries 150 and 155 received from the centralized network controllers to generate output network state data entries. In some embodiments, the output network state data 170 and 175 is control plane data for managing the control plane of the managed forwarding elements 140 and 145 by modifying the way data messages are transmitted between VMs 1-4.

In some embodiments, the local controllers 130 and 135 generate the output network state data entries 170 and 175 to be understandable to different types of managed forwarding elements. The managed forwarding elements 140 and 145 of some embodiments include several different types of managed forwarding elements (e.g., hardware forwarding elements, Open vSwitch (OVS), VMWare™ ESX Server, etc.) that are managed in different ways (e.g., flow entries, configuration instructions, etc.).

Certain types of managed forwarding elements use flow entries that are stored in forwarding tables of the managed forwarding elements. The flow entries define rules, or forwarding behaviors, for the managed forwarding element. The forwarding behaviors determine the way that packets, or data messages, are forwarded through the managed forwarding element. Each flow entry includes a set of conditions to be matched by a packet header and a set of actions (e.g., drop, forward, modify, etc.) to perform on a packet that matches the set of conditions.

Finally, FIG. 1 shows that the output network state data entries 170 and 175 are propagated to managed forwarding elements 140 and 145 respectively. The managed forwarding elements 140 and 145 use the output network state data entries 170 and 175 as control plane data to recompute its data plane (or forwarding plane) behavior. The output network state data entries 170 and 175 of some embodiments are flow entries or other instructions for modifying forwarding behaviors of the managed forwarding elements 140 and 145.

In the example of FIG. 1, VMs of the logical network 100 are distributed through the physical network 102 on various host machines 120 and 125. Each of the VMs are connected to a managed forwarding element of the physical network 102, which is managed by a local controller. The local controllers 130 and 135, managed forwarding elements 140 and 145, and VMs 1-4 all execute on hosts 120 and 125. However, in some embodiments, each of these elements (i.e., the local controllers, managed forwarding elements, and VMs) may be hardware elements, or software elements that execute on separate computing devices. For example, in some embodiments the local controller the local controller runs on a separate computing device from the managed forwarding elements and VMs. In some embodiments, the managed forwarding elements are dedicated hardware forwarding elements, or a combination of hardware and software managed forwarding elements.

I. Waiting Period

Figure 2A:
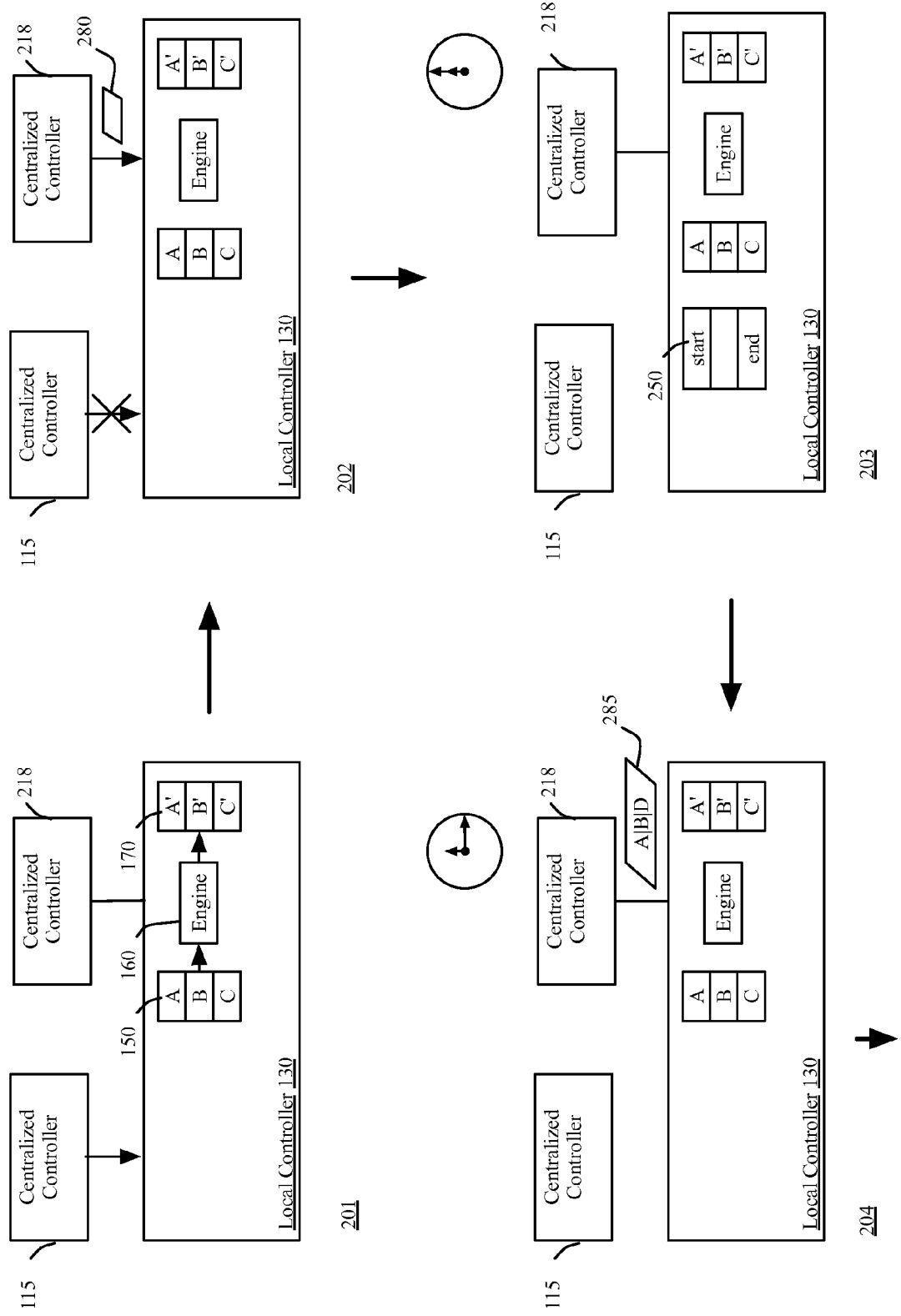
FIGS. 2A-B illustrate an example of using a waiting period to reduce churn in a system.
Figure 2B:
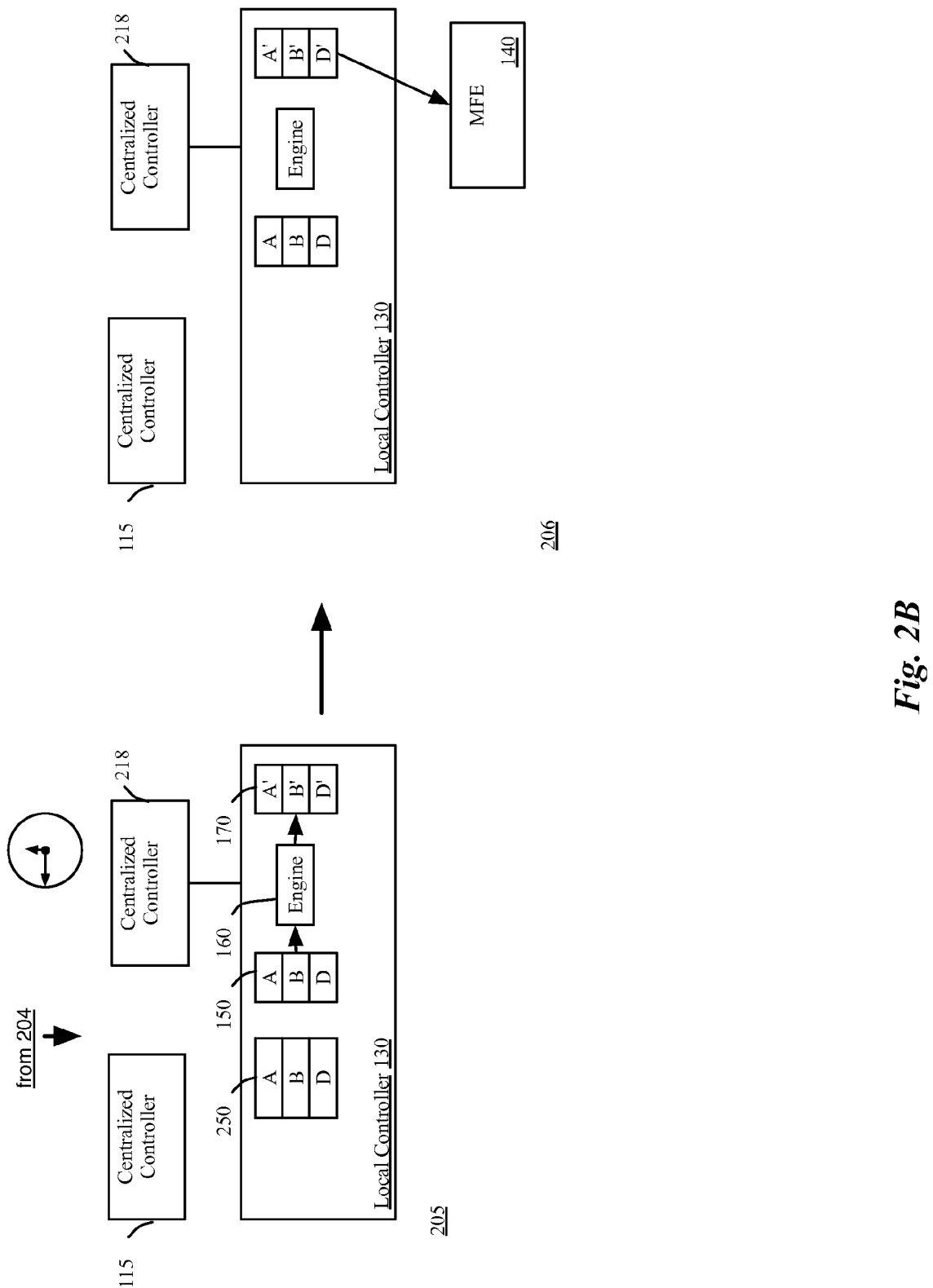

Some embodiments provide a method that reduces churn in a system after receiving new input state by using a waiting period. FIGS. 2A-B illustrate an example of using a waiting period to reduce churn in a network. In particular, this figure illustrates in six stages 201-206 a local controller 130 that uses a waiting period to reduce recalculations and outages in the network. Like FIG. 1, this figure shows local controller 130 is coupled to centralized network controllers 115 to receive input network state data entries that are processed by the local controller 130 to generate output network state data entries. This figure also shows a secondary (or backup controller 218) that is coupled to the local controller 130, but that does not send input network state data entries to local controller 130.

In the first stage 201, local controller 130 receives input network state data entries 150 from a primary centralized network controller 115. The local controller 130 processes the input network state data entries 150 using an engine 160 to generate output network state data entries 170.

In this example, the input network state data entries 150 include entries A, B, and C, while the output network state data entries 170 include entries A', B', and C' to represent that A', B', and C' are the output network state data entries that result from the processing of input network state data entries A, B, and C respectively. Although this example is shown with a one-to-one relationship between the input and output network state data entries, in some embodiments a single input state data entry may result in multiple output network state data entries or vice versa. In some embodiments, the input network state data entries 150 represent an abstract definition (e.g., data tuples) of the network state that is not specific to any of the physical elements of the physical network. The output network state data entries 170 represent control plane data (e.g., flow entries, configuration instructions, etc.) that is provided to the managed forwarding elements (not shown) of the physical network. The managed forwarding elements process the control plane data to modify the data plane of the managed forwarding elements and to implement the network state defined by the controllers.

The second stage 202 shows that the local controller 130 has lost the connection to the primary centralized network controller 115. In addition, the second stage 202 shows that, upon detecting the disconnect, the secondary (or backup) centralized controller 218 takes over as the new primary centralized controller and sends a new set of input network state data 280 to local controller 130. In some embodiments, local controller 130 detects the disconnect and sends a request to the new primary centralized network controller 218 to send the new input network state data.

In the third stage 203, local controller 130 has received the new input network state data 280 as a single transaction 250. The new primary centralized network controller 218 sends the new input network state data 280 to the local controller 130 with (i) a begin message, signaling the beginning of a synchronization transaction, (ii) a complete version of the state (an empty set in this example), and (iii) an end message, signaling the end of the synchronization transaction.

In this example, the received network state data 250 does not contain any input network state data entries. This can result when the secondary controller 218 does not constantly maintain the necessary state for the local controller 130, but rather needs to collect the state from other centralized network controllers (not shown). Rather than tearing down the existing output network state data entries 170 and rebuilding an empty output state, the local controller 130 sets a waiting period 290 to wait for additional updates to the input network state data entries 250 before applying the new input network state data entries 250 to the active network state. If an incorrect or incomplete version of the network state processed and propagated to the managed forwarding elements, this may result in outages or errors for the data plane of the network.

The fourth stage 204 shows that the new primary centralized network controller 218 sends an update 285 (with new input network state data entries A, B, and D) to local controller 130. The waiting period 290 has not yet expired, so the local controller 130 has maintained the existing input and output network state data entries 150 and 170.

In the fifth stage 205, the waiting period 290 has expired and local controller 130 has loaded the new input network state data entries 250 and the received updates 285 as the input network state data entries 150. The local controller 130 has also generated new output network state data entries 170 (A', B', and D') based on the updated input network state data entries 150. Finally, the sixth stage 206 shows that local controller 130 propagates the generated output network state data entries 170 to managed forwarding element 140 to modify the forwarding behaviors of managed forwarding element 140.

Figure 3:
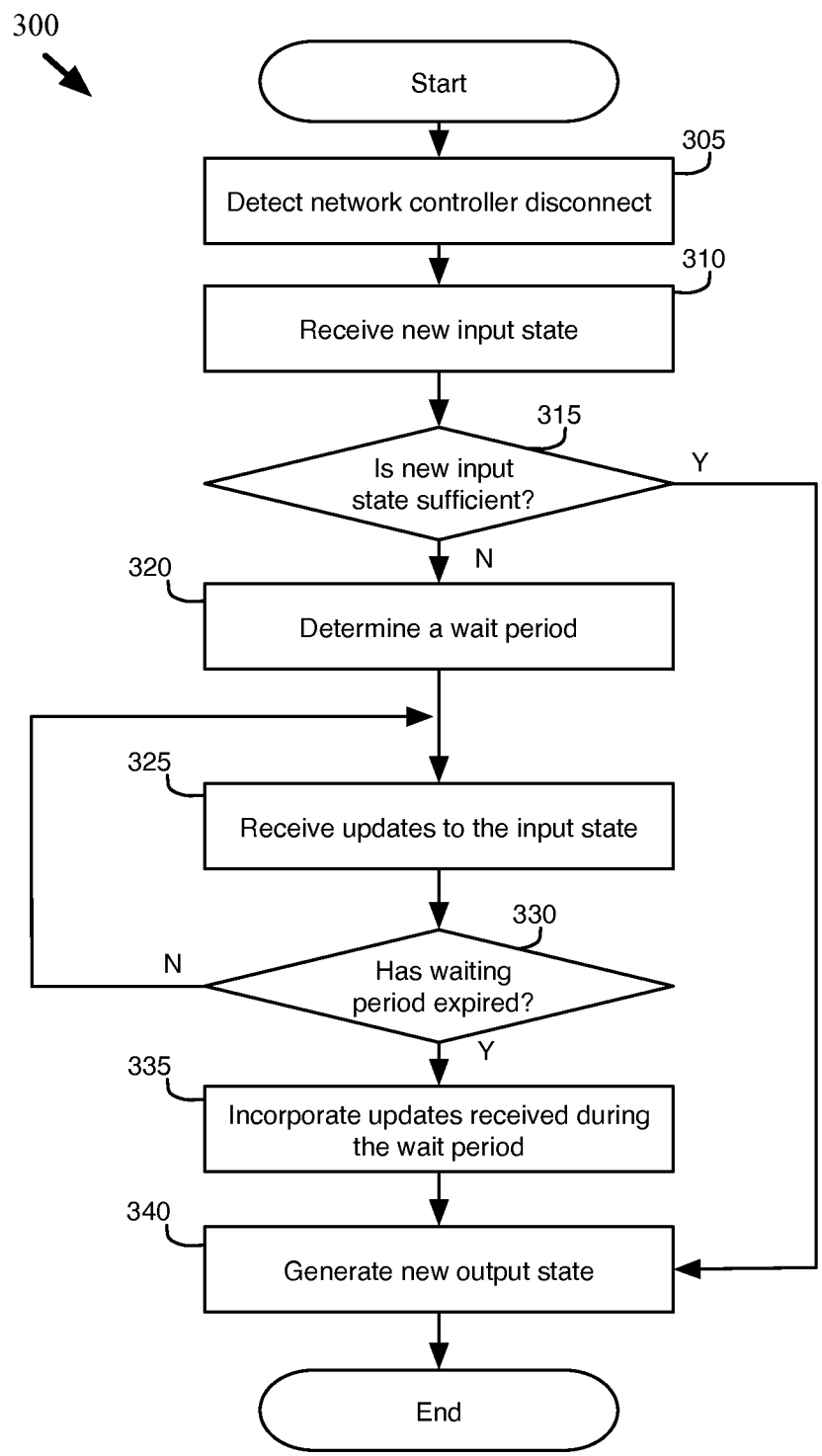
FIG. 3 conceptually illustrates a process for using a waiting period to reduce churn in a system.

FIG. 3 conceptually illustrates a process for using a waiting period to reduce churn in a system. The process 300 of some embodiments is performed by a local controller in a network control system, like local controller 130 of FIGS. 1 and 2, after the local controller loses the connection to a primary centralized network controller. The process 300 begins when the process detects (at 305) that the local controller has disconnected from the primary centralized network controller.

The process 300 then receives (at 310) new input state. In some embodiments, the local controller establishes a new connection to a new centralized network controller. The local controller in some embodiments maintains a secondary connection to a secondary centralized network controller, which takes over the responsibilities of the primary centralized network controller to become the new primary centralized network controller.

After receiving (at 310) the new input state, the process 300 determines (at 315) whether the new input state is sufficient. The new input state may be insufficient when a new primary centralized network controller does not have an up-to-date version of the state. For example, in some cases, a new primary centralized network controller does not maintain the entire network state and has to wait for other centralized network controllers in the system to provide data regarding the current state of the network before it is able to provide current network state data to the local controllers. In some such embodiments, process 300 determines (at 315) that a new input state is sufficient as long as the new input state is not an empty state.

Alternatively or conjunctively, the process 300 of some embodiments determines (at 315) whether new input state is sufficient based on a comparison between the existing input state and the new input state. For example, in some embodiments, the process 300 determines (at 315) that the new input state is sufficient as long as the size of the new input state is within a certain percentage (e.g., +/−10%) of the existing input state.

When the process 300 determines (at 315) that the new input state is sufficient, the process 300 transitions to 340, which will be described further below. Otherwise, the process 300 transitions to 320. At 320, the process 300 of some embodiments determines a waiting period for implementing the changes of the new input state.

The waiting period allows a local controller to receive additional updates to the input state and to avoid making unnecessary changes to the output state due to incomplete state data. The process 300 of some embodiments determines (at 320) the waiting period based on the size of the network for which the centralized network controllers manage state data. For example, in some embodiments, the waiting period is calculated based on an estimated amount of time required for the centralized network controllers to calculate and synchronize the network state data throughout the network. In some of these embodiments, the process 300 determines (at 320) the amount of time necessary for a full synchronization based on a number of network elements (e.g., forwarding elements, ports, access control lists (ACLs), etc.) in the network. In some embodiments, rather than calculating the waiting period directly, the process 300 receives a value for the waiting period from a centralized network controller (e.g., 115 or 218) of the centralized network controller cluster.

Alternatively, or conjunctively, the process 300 determines (at 320) the length of the waiting period based on an analysis of the new input network state data entries received from the centralized network controller. For example, in some embodiments, the length of the waiting period depends on a comparison of a size of the received new input network state data with a size of the existing input network state data, or is based on a size of the logical network. In other cases, the process 300 only uses a waiting period when the new input state is empty, indicating that the new controller has not yet been updated with a desired network state.

The process 300 then receives (at 325) updates to the input state from the new primary centralized network controller. In some embodiments, unlike the new input state received at 310, the updates received from the new primary centralized network controller do not represent the entire state for the local controller, but only modifications made to the state since a previous update (or synchronization) from the centralized network controller.

The process 300 then determines (at 330) whether the waiting period has expired. When the waiting period has not yet expired, the process 300 transitions back to 325. Once the waiting period has expired, the process 300 incorporates (at 335) the updates received during the waiting period into the new input state received at 310.

The process 300 then generates (at 340) new output state based on the new input state and any updates received during the waiting period. The process 300 of some embodiments then uses the new output state to modify forwarding behaviors of managed forwarding elements to implement the new network state.

II. Computing Output State Based on Differences in Input State

In some embodiments, in addition to or instead of calculating waiting periods, the local controller generates new output state based on differences between the new version of the input state and an existing version of the input state, in order to avoid unnecessary recalculations and unavailability of the state.

Figure 4A:
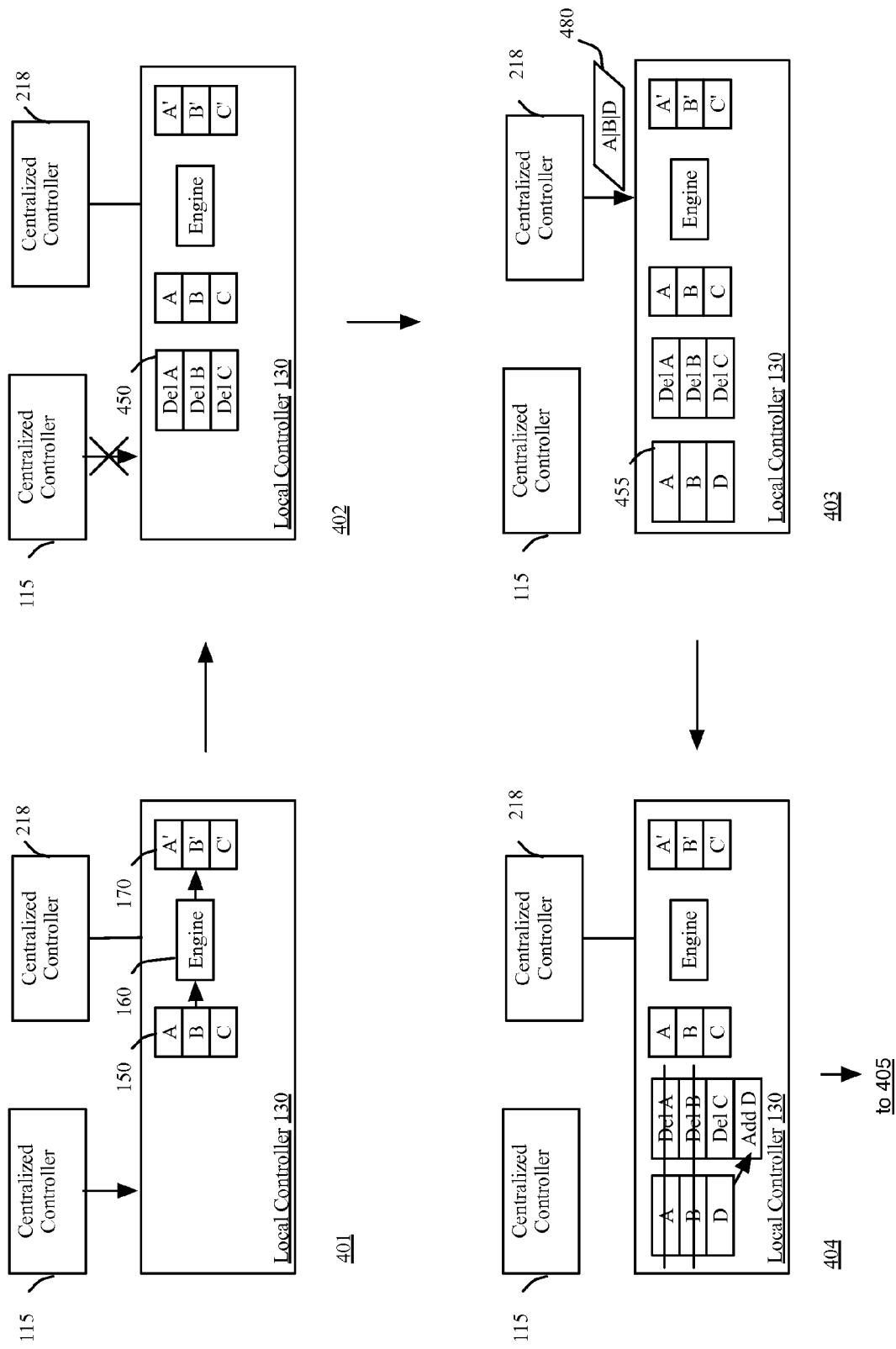
FIGS. 4A-B illustrate an example of calculating differences between versions of network state.
Figure 4B:
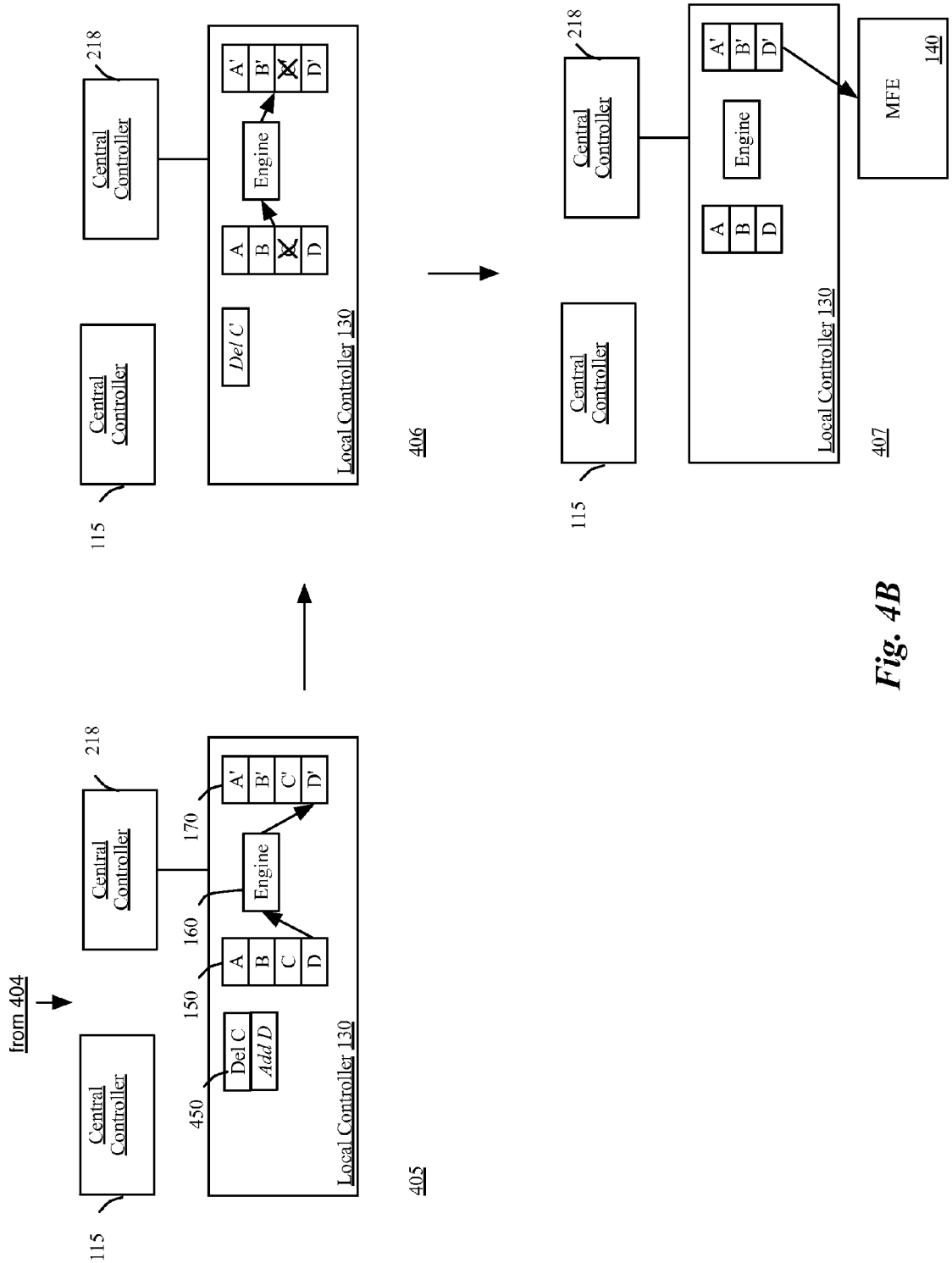

FIGS. 4A-B illustrate an example of calculating differences between different versions of network state. In particular, this figure illustrates in seven stages 401-407 a local controller 130 that calculates differences between the new input network state data entries and existing input network state data entries to reduce recalculations and outages in the data plane. Like the example of FIGS. 2A-B, local controller 130 is coupled to primary centralized network controller 115 and secondary centralized network controller 218 to receive input network state data entries 150 that are processed by the local controller 130 to generate output network state data entries 170.

The first stage 401 shows that local controller 130 receives input network state data entries 150 from primary centralized network controller 115 and processes the input network state data entries 150 using engine 160 to generate output network state data entries 170.

In some embodiments, the local controller 130 stores the input network state data entries 150 received from the centralized network controller 115 in a set of input tables and generates the output network state data entries 170 by processing the received input network state data entries 150 to create output network state data entries 170 in a set of output tables. The engine 160 of some embodiments processes the input network state data entries 150 by performing a series of table joins on the set of input tables to generate the set of output tables with the output network state data entries 170.

The second stage 402 shows that the local controller 130 has lost the connection to primary centralized network controller 115 and established a new connection to secondary centralized network controller 218, which takes over as the new primary centralized network controller. In addition, the second stage 202 shows that, upon detecting the disconnect, the local controller 130 marks all of the existing input network state data entries 150 (i.e., A, B, and C) for deletion. In this example, the local controller 130 marks the existing input network state data entries 150 for deletion by adding entries to a shadow table 450 to delete the input network state data entries A, B, and C.

The third stage 403 shows that the new primary centralized network controller 218 sends new input network state data entries 480 (i.e., A, B, and D) to the local controller 130. In this example, network state data entries A and B have corresponding entries in the existing input network state data entries 150. Input network state data entry D is a new entry that has no matching entry in the existing input network state data entries 150 and input state data entry C of the existing input network state data entries 150 is a stale input state data entry with no matching input state data entry in the new input network state data entries 455.

In the fourth stage 404, the local controller 130 unmarks the matching input network state data entries by removing the entries for deleting entries A and B from shadow table 450. The fourth stage 404 also shows that an entry to "Add D" has been added to the shadow table 450.

In the fifth stage 405, the entries to delete A and B have been removed from the shadow table 450 and the entry to "Add D" in shadow table 450 has been processed. Input state data entry "D" has been added to the existing input tables 150 and new output entry D' has been created in the output tables 170. In this example, entries for adding new entries from the new input network state data entries are processed before processing any entries for deleting existing state data. This ensures that necessary existing state is not torn down before the new state is built up.

In the sixth stage 406, local controller 130 processes the entry in shadow table 450 to "Delete C" from existing input network state data entries 150. The change is then propagated through to the output network state data entries 170 by engine 160. In some embodiments, rather than propagating the deleted entries through engine 160, local controller 130 directly deletes network state data entries from both the input network state data entries 150 and the output network state data entries 170, without recalculating the output network state data entries. Finally, the seventh stage 407 shows that local controller 130 propagates the generated output network state data entries 170 to managed forwarding element 140 to modify the forwarding behaviors of managed forwarding element 140.

Figure 5:
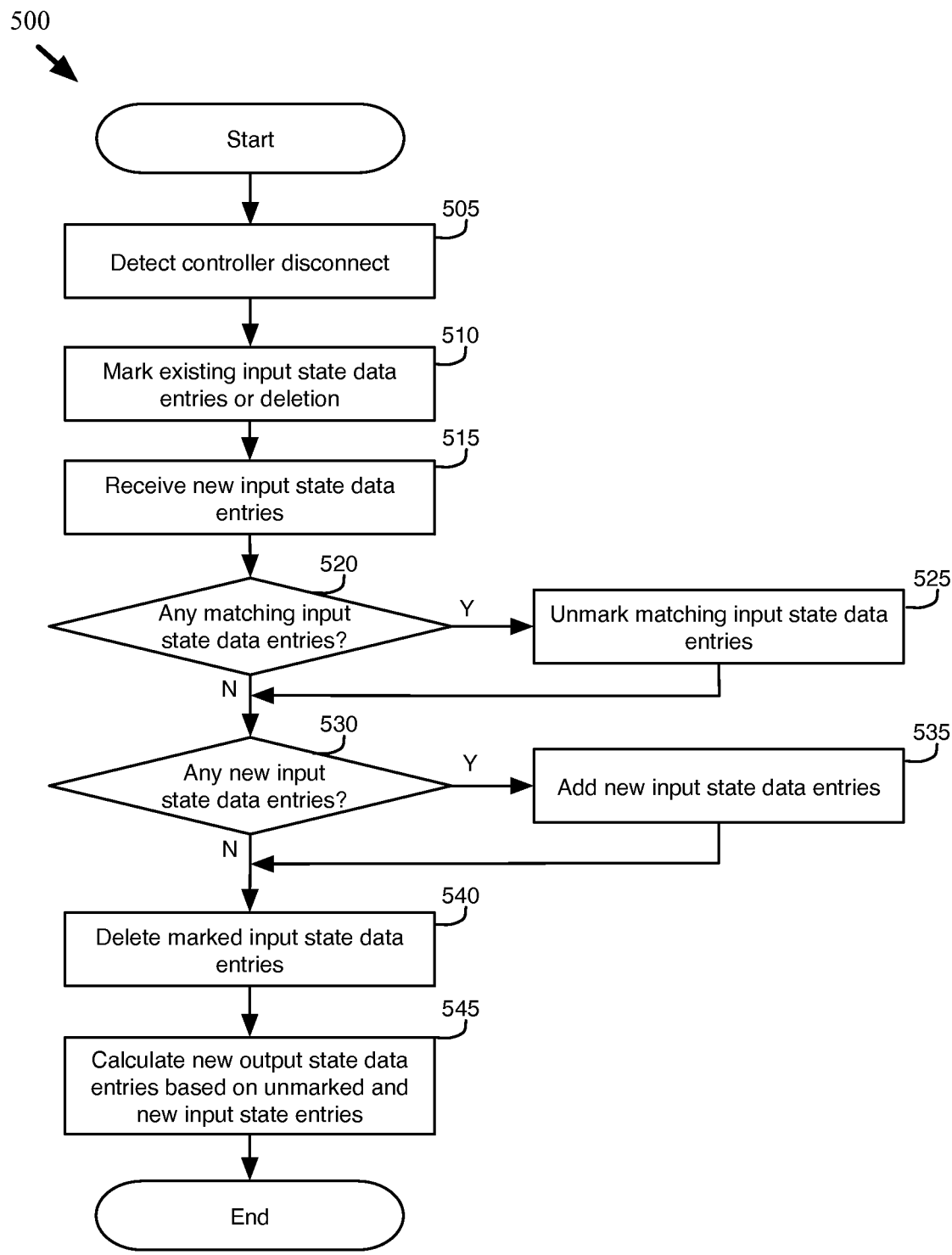
FIG. 5 conceptually illustrates a process for calculating differences between versions of network state.

FIG. 5 conceptually illustrates a process for calculating differences between versions of network state. The process 500 of some embodiments is performed by a local controller in a network control system, like local controller 130 of FIG. 4, after the local controller loses the connection to a primary centralized network controller. The process 500 begins when the process 500 detects (at 505) that the local controller has disconnected from the primary centralized network controller.

Upon detecting (at 505) that the local controller has disconnected, the process 500 then marks (at 510) all of the existing input state for deletion. In some embodiments, the process 500 marks (at 510) the existing input network state data entries for deletion using shadow tables. In order to mark the input network state data entries for deletion, the local controller of some embodiments stores a set of entries that indicate the input network state data entries to be deleted in a set of shadow tables before applying the changes (i.e., deleting the network state data entries) to the active input and output states.

Once the existing input network state data entries are marked for deletion, the process 500 receives (at 515) new input network state data entries from a new primary centralized network controller.

At 520, the process 500 determines whether the new input state data includes any duplicate input network state data entries or input network state data entries that have matching network state data entries in the existing input state data. When the process 500 determines (at 520) that the new input state data includes matching input network state data entries, the process 500 unmarks (at 525) the matching input network state data entries in the existing input state data so that they are no longer marked for deletion. In some embodiments, the process 500 unmarks (at 525) the matching input network state data entries by removing entries corresponding to the matching input network state data entries from the shadow tables described above.

When the process 500 determines (at 520) that the new input state data does not include matching input network state data entries, or the matching network state data entries have been unmarked (at 525), the process 500 determines (at 530) whether the new input state data includes any input network state data entries that do not have matching input network state data entries in the existing input network state data entries. When the process 500 determines (at 530) that the new input state data does include new input network state data entries, the process 500 adds (at 535) the new input network state data entries to the existing input network state data entries.

When the process 500 determines (at 530) that the new input state data does not include any new input network state data entries, or the new input network state data entries have been added (at 535), the process 500 deletes (at 540) the existing input network state data entries that are still marked for deletion.

In some embodiments, like the process 300 described above with reference to FIG. 3, the process 500 also determines a waiting period during which to collect a set of updates to the input network state data entries, and calculates differences for all of the updates received during the waiting period. The process 500 of some embodiments uses different waiting periods for adding new input network state data entries versus deleting existing input network state data entries. Finally, the process 500 calculates (at 545) new output network state data entries based on the unmarked matching input network state data entries and the added new input network state data entries.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

III. Electronic System

Figure 6:
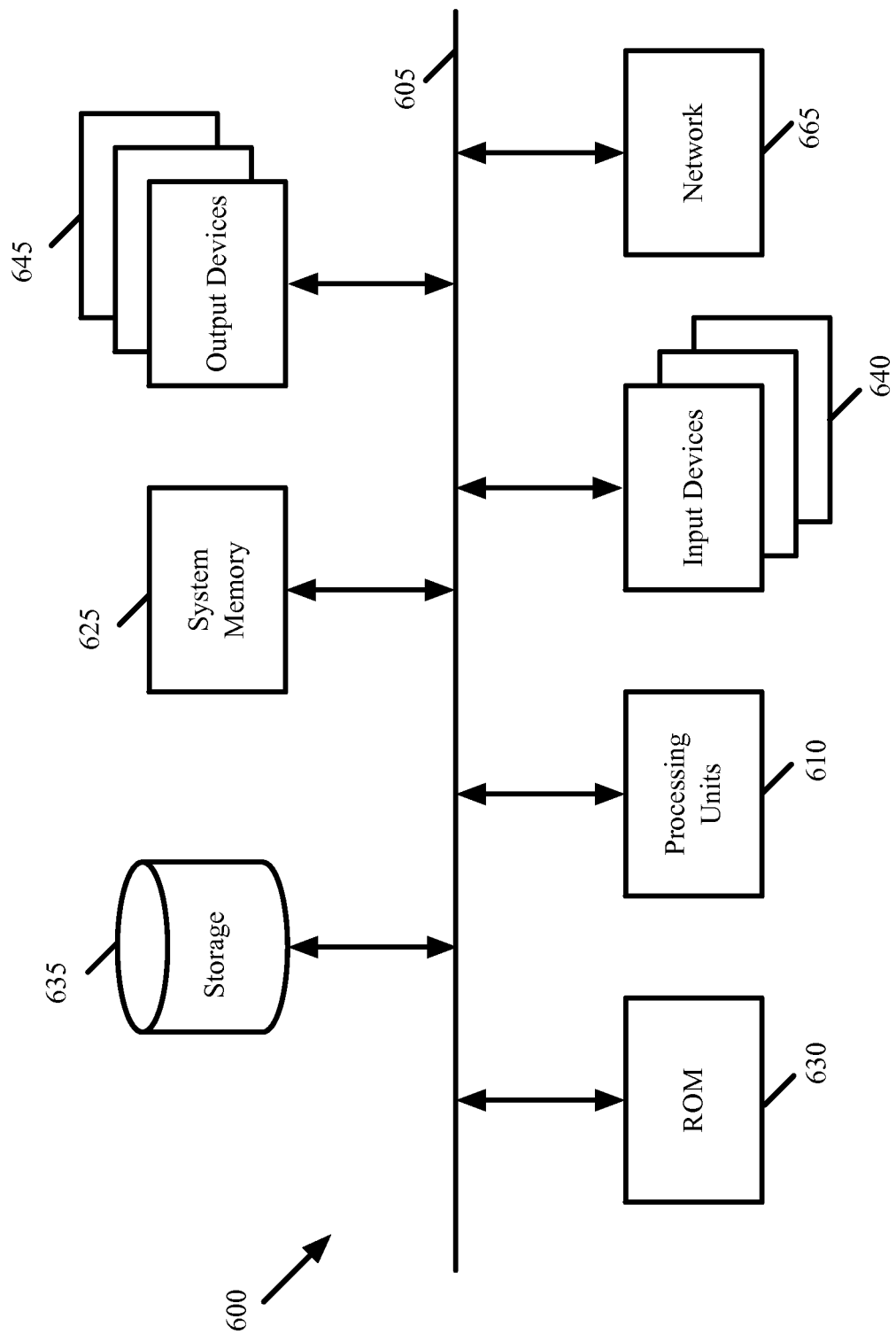
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage machine 635, input machines 640, and output machines 645.

The bus 605 collectively represents all system, peripheral, and chipset buses that communicatively connect the numerous internal machines of the computer system 600. For instance, the bus 605 communicatively connects the processing unit(s) 610 with the read-only memory 630, the system memory 625, and the permanent storage machine 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage machine 635, on the other hand, is a read-and-write memory machine. This machine is a non-volatile memory unit that stores instructions and data even when the computer system 600 is off. Some embodiments of the invention use a mass-storage machine (such as a magnetic or optical disk and its corresponding disk drive) as the permanent storage machine 635.

Other embodiments use a removable storage machine (such as a floppy disk, flash drive, etc.) as the permanent storage machine. Like the permanent storage machine 635, the system memory 625 is a read-and-write memory machine. However, unlike storage machine 635, the system memory is a volatile read-and-write memory, such a random access memory. The system memory stores some of the instructions and data that the processor needs at runtime. In some embodiments, the invention's processes are stored in the system memory 625, the permanent storage machine 635, and/or the read-only memory 630. From these various memory units, the processing unit(s) 610 retrieve instructions to execute and data to process in order to execute the processes of some embodiments.

The bus 605 also connects to the input and output machines 640 and 645. The input machines enable the user to communicate information and select commands to the computer system. The input machines 640 include alphanumeric keyboards and pointing machines (also called "cursor control machines"). The output machines 645 display images generated by the computer system. The output machines include printers and display machines, such as cathode ray tubes (CRT) or liquid crystal displays (LCD). Some embodiments include machines such as a touchscreen that function as both input and output machines.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological machines. These terms exclude people or groups of people. For the purposes of the specification, the terms display or displaying means displaying on an electronic machine. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 3 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

We claim:

1. A method for maintaining a consistent network state for a set of managed forwarding elements in a first network controller, the method comprising:
    determining that a second network controller has disconnected, wherein a first network state at the first network controller is based on a first input state received from the second network controller;
    receiving a second input state from a third network controller that takes over providing input state to the first controller after the second network controller has disconnected, the second input state for generating a second network state;
    maintaining the first network state for a predetermined amount of time after receiving the second input state to incorporate a set of updates to the second input state received from the third network controller; and
    after the predetermined amount of time, generating the second network state based on the second input state and any updates received during the predetermined amount of time.

2. The method of claim 1 further comprising updating the set of managed forwarding elements according to the second network state.

3. The method of claim 2, wherein updating the set of managed forwarding elements comprises modifying forwarding behaviors of the set of managed forwarding elements based on the second network state by propagating a set of flow entries that define the forwarding behaviors to the set of managed forwarding elements.

4. The method of claim 2, wherein the set of managed forwarding elements comprises a software forwarding element that operates on a same computing device as the first network controller, wherein the second and third network controllers are centralized network controllers that provide input state to a plurality of additional controllers that operate on computing devices with additional managed forwarding elements.

5. The method of claim 4, wherein the software forwarding element is for forwarding network data for at least one virtual machine hosted on the computing device.

6. The method of claim 1, wherein the predetermined amount of time is determined based on an amount of time necessary for a full synchronization of network state for the network.

7. The method of claim 1 further comprising modifying the predetermined amount of time based on a comparison of a size of the received second input state with a size of the first input state.

8. The method of claim 1 further comprising increasing the predetermined amount of time when the received second input state is empty.

9. The method of claim 1, wherein generating the second network state comprises:
    marking all of the first input state for deletion;
    identifying entries in the second input state that correspond with entries in the first input state; and
    unmarking the entries in the first input state that correspond with the identified entries in the second input state.

10. The method of claim 1, wherein generating the second network state comprises identifying a set of entries of the received second input state that have no corresponding entries in the first input state and calculating new network state data entries from the identified set of entries.

11. The method of claim 10, wherein the predetermined amount of time is a first period of time waited prior to calculating the new network state data entries from the identified set of entries, the method further comprising waiting a second period of time prior to deleting entries of the first network state for which corresponding entries of the first input state do not have matching entries in the second input state.

12. The method of claim 11, wherein the second period of time is longer than the first period of time.

13. The method of claim 1, wherein the first and second input states define a logical network for implementation by the set of managed forwarding elements in addition to a plurality of additional managed forwarding elements.

14. The method of claim 1, wherein receiving the second input state comprises:
    receiving a first message from the third network controller to signal the beginning of a synchronization process;
    receiving the new input state from the third network controller; and
    receiving a second message from the third network controller to signal the end of the synchronization process.

15. A non-transitory computer readable medium storing a program which when executed by at least one processing unit of a first controller maintains a consistent network state for a set of managed forwarding elements, the program comprising sets of instructions for:
    determining that a second network controller has disconnected, wherein a first network state at the first network controller is based on a first input state received from the second network controller;
    receiving a second input state from a third network controller that takes over providing input state to the first controller after the second network controller has disconnected, the second input state for generating a second network state;
    maintaining the first network state for a predetermined amount of time after receiving the second input state to incorporate a set of updates to the second input state received from the third network controller; and
    after the predetermined amount of time, generating the second network state based on the second input state and any updates received during the predetermined amount of time.

16. The non-transitory machine readable medium of claim 15, wherein the program further comprises a set of instructions for updating the set of managed forwarding elements according to the second network state by modifying forwarding behaviors of the set of managed forwarding elements based on the second network state.

17. The non-transitory machine readable medium of claim 16, wherein the set of instructions for modifying forwarding behaviors of the set of managed forwarding elements comprises a set of instructions for propagating a set of flow entries that define the forwarding behaviors to the set of managed forwarding elements.

18. The non-transitory machine readable medium of claim 16, wherein the set of managed forwarding elements comprises a software forwarding element that operates on a same computing device as the first network controller and is for forwarding network data for at least one virtual machine hosted on the computing device.

19. The non-transitory machine readable medium of claim 18, wherein the second and third network controllers are centralized network controllers that provide input state to a plurality of additional controllers that operate on computing devices with additional managed forwarding elements.

20. The non-transitory machine readable medium of claim 15, wherein the predetermined amount of time is determined based on an amount of time necessary for a full synchronization of network state for the network.

21. The non-transitory machine readable medium of claim 15, the program further comprising a set of instructions for modifying the predetermined amount of time when the received second input state meets a set of criteria.

22. The non-transitory machine readable medium of claim 21, the program further comprising a set of instructions for determining whether the received second input state meets the set of criteria by comparing a size of the received second input state with a size of the first input state.

23. The non-transitory machine readable medium of claim 15, wherein generating the second network state comprises identifying a set of entries of the received second input state that have no corresponding entries in the first input state and calculating new network state data entries from the identified set of entries.

24. The non-transitory machine readable medium of claim 23, wherein the predetermined amount of time is a first period of time waited prior to calculating the new network state data entries from the identified set of entries, the program further comprising a set of instructions for waiting a different second period of time prior to deleting entries of the first network state for which corresponding entries of the first input state do not have matching entries in the second input state.

25. The non-transitory machine readable medium of claim 15, wherein the set of instructions for receiving the second input state comprises sets of instructions for:
  receiving a first message from the third network controller to signal the beginning of a synchronization process;
  receiving the new input state from the third network controller; and
  receiving a second message from the third network controller to signal the end of the synchronization process.

* * * * *